Sept. 29, 1936.  J. J. ALLES  2,056,085
ELECTRIC CABLE
Original Filed June 18, 1930
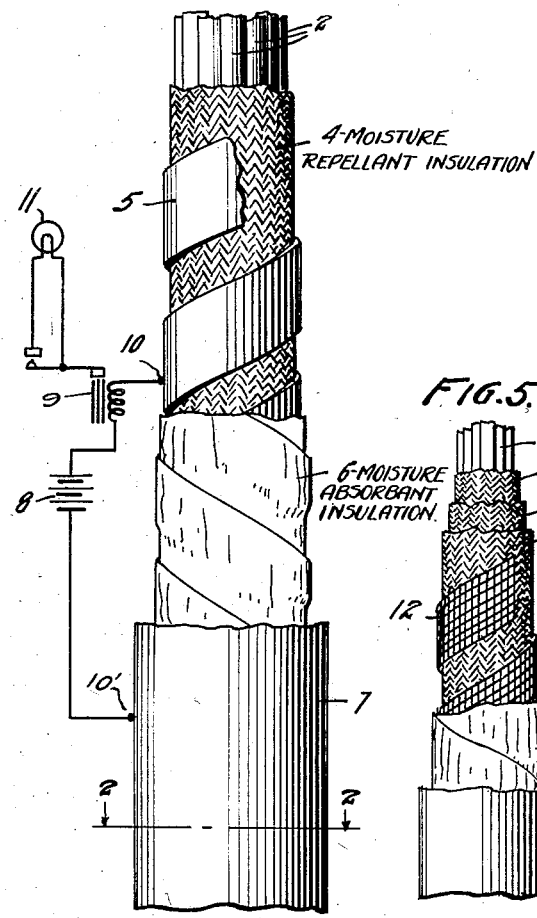
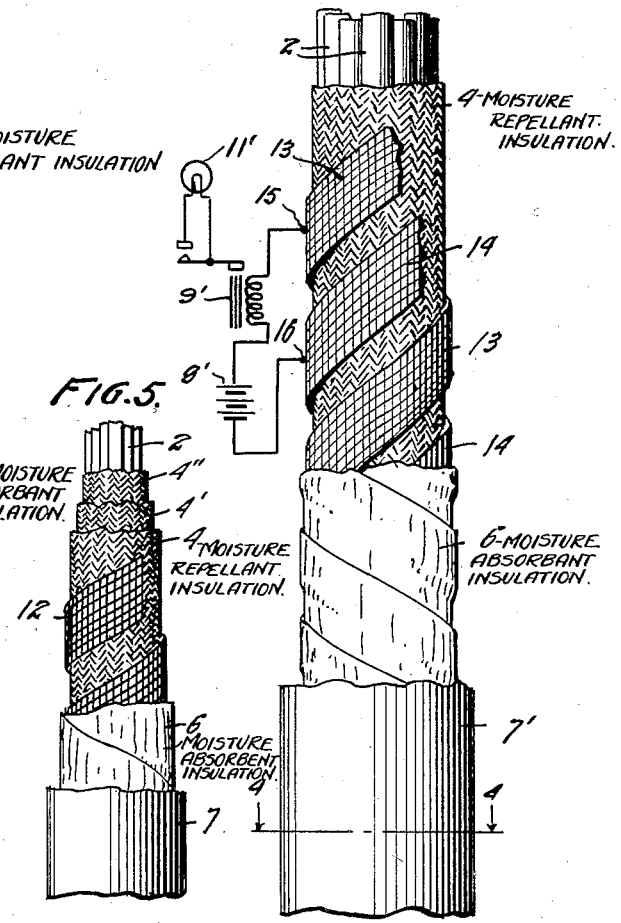
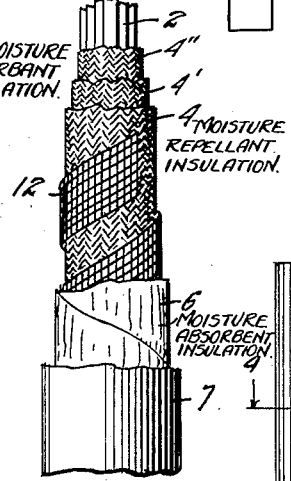
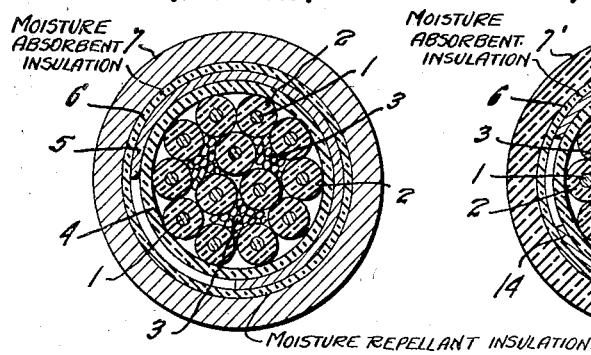
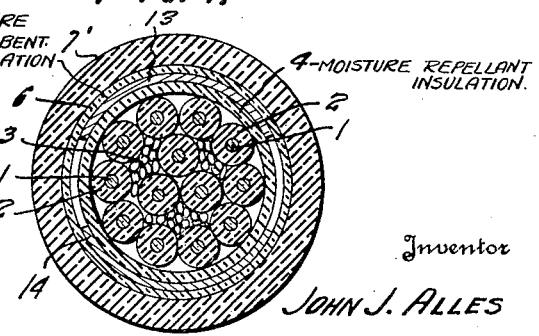
Inventor
JOHN J. ALLES
By Semmes & Semmes
Attorneys Patented Sept. 29, 1936

2,056,085

UNITED STATES PATENT OFFICE 2,056,085

ELECTRIC CABLE

John J. Alles, Wilkes-Barre, Pa.

Application June 18, 1930, Serial No. 462,087
Renewed January 25, 1935

4 Claims. (Cl. 173—264)

The invention relates to electric cables and more particularly has reference to a method and means for detecting and locating faults therein.

Electric cables constructed in accordance with the usual practice are formed of a plurality of insulated cable conductors which are grouped together and are wrapped with one or more layers of covering material, which besides functioning as an insulator is usually of the moisture repellent type and also serves to bind the conductors together. Some practice, however, instead of forming the covering insulation of moisture repellent material, makes use of a fibrous material such as paper, which is moisture absorbent. Whichever of these practices is followed the cable construction formed is usually encased within a sheath generally of lead, although in some instances a non-metallic sheath is employed. Substantially the same practice is followed when a cable having a single conductor is formed.

As is well known, cables covered with moisture repellent insulation or with insulation which absorbs moisture, frequently become impaired due to moisture coming in contact with the conductors, or due to mechanical injury to the cable itself. It is thus impossible to locate a fault in the cable due to electrolysis or the entering of water through the cable coverings into the conductors until the conductors are actually short circuited and successful use of the cable is arrested. To locate the exact position of the fault, the cable is tested by means of a Varley or Murray loop. This procedure necessarily places the damaged cable out of service during the time consumed by the test, as a high voltage current is passed through the cable in order that the test may be carried out. Aside from the loss of time due to the testing, the cable is frequently left in an impaired condition.

While constructions for associating an indicating conductor with an electric cable, for the purpose of detecting faults therein, have been devised, they have possessed a complicated and necessarily an expensive design. Moreover, the surface area of the cable core covered by such indicating conductors has been relatively small so that there is a great possibility of moisture seeping through the cable and into the conductors without being detected.

The major object of my invention is the provision of a method and means which ameliorate the disadvantages of the prior art for quickly and accurately detecting and locating a fault in an electric cable.

An equally important object of the invention is the location of a fault due to electrolysis in an electric cable before moisture has reached the conductors of the cable.

Another object of the invention is the devising of an indicating conductor in the form of a metallic ribbon adapted to be associated with an electric cable.

Still another object of the invention is the provision of an indicating conductor in the form of a wire gauze or mesh tape adapted to be associated with an electric cable for locating faults therein.

Yet another object of the invention is the association with an electric cable of an indicating conductor in the form of a metallic strip which is wound upon the core of the cable in a spiral.

A further object of the invention is the provision of an electric cable having a metallic ribbon indicating conductor spirally wound adjacent the insulating and moisture repellant covering over the cable conductors or conductor, and a moisture absorbent insulation wound over the indicating conductor, the whole construction being placed within a sheath.

A still further object of the invention is the provision of an electric cable having a plurality of metallic indicating conductors in the form of ribbons or tapes spirally wound adjacent the insulating and moisture repellent covering over the cable conductor or conductors, and a moisture absorbent insulation wound over the indicating conductors, the whole construction being encased within a non-metallic sheath.

An additional object of the invention is to provide an indicator conductor substantially surrounding the insulating and moisture repellent covering over a cable conductor and having a resistance greater than the resistance of a solid conductor of the same material and dimensions.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The invention comprehends the provision of a method and means for detecting and locating faults in an electric cable. One method of practically effecting the concept of the invention is the association with a cable having one or more insulated conductors additionally bound with other insulating and water repellent material, of one or more metallic ribbons or tapes, employed as indicating conductors. A cable thus constructed is wrapped with moisture absorbent insulation and the case is placed within a sheath. The invention further comprehends the provision of means to be employed in conjunction with the indicating conductor or conductors to indicate when a fault has occurred.

In order to make my invention more clearly understood, I have shown in the accompanying drawing, means for carrying the same into practical effect without limiting the improvements in their useful applications to the particular constructions, which for the purpose of explanation, have been made the subject of illustration.

In the drawing:

Figure 1 is a partial horizontal sectional view of one form of electric cable showing an insulating conductor associated therewith.

Figure 2 is a vertical section along the line 2—2 of Figure 1.

Figure 3 is a partial horizontal sectional view of a cable having a plurality of indicating conductors associated therewith.

Figure 4 is a vertical sectional view along the line 4—4 of Figure 3.

Figure 5 is a partial horizontal sectional view of a slightly modified form of cable and different type of indicating conductor.

Throughout the drawing similar reference numerals refer to like parts in the different views.

There is shown in Figures 1 and 2, an electric cable having a plurality of conductors 1, which are separately insulated by means of the conductor insulation 2 of rubber or other suitable material. As may be observed from Figure 2, a suitable filler 3, for example a jute filler, is placed between the cable conductors.

For the purpose of binding the cable conductors together, as well as to afford further insulation, and to prevent moisture from reaching the cable conductors, a suitable moisture repellent material 4 is wrapped around the cable conductors and the filler. The material 4 may be of rubber treated cloth or tape, or any other desired substance of this nature.

While in Figures 1 and 2 only one wrapper or layer of moisture repellent material 4 is employed, this construction need not necessarily be followed. In fact it is preferable to employ a plurality of layers of repellent material 4 so as to substantially prevent the seeping of moisture into the cable conductors. Such a construction is disclosed in Figure 5 where the conductors are wrapped with three layers of moisture repellent material 4, 4' and 4''.

One of the objects of the invention is the provision of an indicating conductor adapted to be associated with an electric cable for the purpose of locating faults in the cable. A conductor of this type is shown in Figures 1 and 2 where a metallic ribbon 5 is wound around the wrapping or covering material 4 over the cable conductors. As may be observed, the indicating conductor is spiralled around the covering 4 and extends for the full length of the cable.

The indicating conductor may be formed of thin copper, although it is to be understood that other metals and alloys may be employed if desired. I have discovered, however, that a copper ribbon possessing a thickness of 0.003" and a width of one inch, gives very satisfactory results. It is to be understood, however, that the invention is not limited to a ribbon of this width or thickness as obviously a variation in either or both of these dimensions may be made without departing from the spirit of the invention or the scope of the appended claims.

Over the metallic ribbon 5 there is placed a suitable wrapping of absorbent insulating material 6. Paper, I have found, works very satisfactorily, although other materials which possess insulating and absorbing qualities may be used. This material may be made up in the form of a ribbon and may be closely wound over the indicating conductor so that it forms a continuous uninterrupted covering for the indicating conductor.

The cable core having been formed as described and the indicating conductor and absorbent insulation having been associated therewith, it is placed within a lead sheath 7. It is to be understood, however, that a sheath formed of a metal or metals other than lead may be employed if desired. Also, as will hereinafter appear, a sheath 7' formed of a non-metallic material, shown in Figure 3, may be used.

When the indicating conductor of Figure 1 is employed with the cable, a source of electricity 8 is connected through the magnetizing coil of a relay 9, to the indicating conductor at any suitable point 10. The source of electricity is also connected at 10' to the lead sheath 7. Relay 9 is provided with a suitable indicator 11 adapted to indicate the closing of the circuit between the indicating conductor 5 and the lead sheath 7.

In operation, it will be apparent that should any moisture seep through the lead sheath, it will be at once attracted by the moisture absorbent material 6, and upon such an event occurring, a circuit through the lead sheath and the indicating conductor will be closed. As the result of such a circuit being set up, the relay 9 is affected, and this may be observed by the actuation of the indicating device 11. It is thus apparent that there is a fault in the cable.

To locate the exact position of the fault, a test is run employing the principles of the Wheatstone bridge for measuring resistances. The resistances of the bridge being known and also the resistance per linear foot of the indicating conductor, the position of the fault may be located. The fault having been located, it may be remedied in the usual manner.

In the place of using a solid metallic ribbon, a gauze tape of a comparatively fine mesh may be employed for the indicating conductor. This construction is disclosed in Figure 5 where a gauze mesh ribbon 12 is disclosed. As in the embodiment of the invention shown in Figures 1 and 2, a similar means for detecting and locating a fault, that is the source of electricity with relay and indicator, is shown.

In the event that the cable is to be encased in a non-metallic sheath 7', a plurality of indicating conductors are needed. In Figure 3 a cable similar to that of Figure 1 is provided with two metallic gauze mesh ribbon indicating conductors 13 and 14. These indicating conductors are spiralled around the wrapping 4, in a manner previously described, and are covered with a moisture absorbing insulation 6.

It should be noted that the indicating conductors 13 and 14 are separated from each other and are wrapped in the same direction so that corresponding points on each conductor lie substantially in the same plane. However, this practice need not be followed. For example, the indicator conductors could be wrapped in opposite directions to each other so that they cross one another. With such a modification, it would be necessary that the moisture absorbent material 6 be placed between the two indicating conductors. Thus one indicator conductor would be placed around this covering 4, the moisture absorbing material placed over it, and the second indicating conductor wrapped over the moisture absorbent material 6.

Instead of providing a single wrapping of repellent material 4, two additional wrappings 4' and 4'' could be used.

Irrespective of the manner in which the two indicating conductors of Figures 3 and 4 are placed around the covering material 4, one of the conductors is connected at 15 to one side of a source of electricity 8' through a relay 9', and the other indicator conductor is also connected as shown at 16, to the source of electrical energy. As in the previous cases, just described, it is evident that upon moisture seeping through sheath 7' it will be immediately attracted by the moisture absorbent material 6, and a circuit established between the indicating conductors which will cause the indicator 11' of the relay to be actuated. The fault may then be located in a manner similar to that previously mentioned.

In all of the modifications disclosed, it will be appreciated that besides being of great advantage in detecting faults in the cables due to the occurrence of electrolysis, a mechanical fault may also be determined. For example, should the sheath of the cable be ruptured or bent in such a manner as to cause the sheath and indicating conductor to contact, a circuit between them would be set up and the relay actuated. Where a plurality of indicating conductors are employed, upon contact being made between them due to mechanical injury, a similar result would occur.

It has been pointed out that in the usual manner of locating cable faults, it is necessary to place the cable out of commission. This procedure is of course obviated in the construction which I have disclosed. In the method employed for locating faults, a high voltage is sent through the cable conductor, which is thought to be damaged, and the metallic sheath so as to cause an arc between the same to carbonize the insulation in the filler 3 and covering material 4, in order to reduce the fault resistance to as low a value as possible. It necessarily follows that with such procedure there is a great possibility of leaving the cable seriously injured after locating the fault. Such a condition can not occur with the use of the indicating conductor or conductors, as these members are employed to locate the fault, and not the cable conductors themselves.

Another feature of the invention resides in the fact that moisture is substantially prevented from reaching the cable conductors themselves, because of the moisture repellent material placed around them. Moreover any moisture adjacent the material 4 is quickly detected before it has a chance to work through the material to the conductors. The quickness of the detection of the fault is greatly increased because of the great area of the cable covered by the indicating conductors, whether one or a pair of them are used, and also because the entire cable core is covered with the moisture absorbent insulation.

Each conductor which extends around and around the cable, is of a comparatively great width, and there is a comparatively small distance separating each spiral. Hence it may be observed that the surface area of the moisture repellent material 4 is substantially covered, and because of the high moisture absorbent characteristic of the insulation 6, any moisture thereon will immediately aid in creating a circuit between the indicating conductor and the lead sheath, or between the two indicating conductors when a non-metallic sheath is employed.

In the method used for locating faults in the usual type of cable, such as those previously described, a high fault resistance is obtained. This is due to the fact that the injured conductor and the lead sheath must be connected at the point where the fault occurs. The distance between any cable conductor and the lead sheath is comparatively great, and this alone affords a high fault resistance. However, consideration must also be given to the fact that between any cable conductor and the sheath there are a number of thicknesses of material which must be broken down before the conductive path can be established.

By the use of the indicating conductor it is apparent that the distance of this path of flow for the current is greatly decreased as the indicator conductor is separated from the sheath only by a thin layer of absorbent material. Moreover, there is but little resistance offered by the moisture absorbent material 6 after it has become moist. Tests which I have conducted show that with one drop of water on the moisture absorbent insulation, a fault resistance of between 30 and 50 ohms is obtained.

It may also be observed that the indicating conductors have a comparatively high resistance when compared to a cable conductor, especially where large cable conductors are employed. The resistance here referred to is that of the cable conductor itself, and is to be distinguished from the fault resistance or that offered to a current passing from a damaged conductor to the lead sheath in locating faults. As is well known, difficulty is encountered in measuring small resistances, and as methods for locating the position of faults depend upon the measurement of the resistances, the advantage of using a thin metallic ribbon instead of one of the cable conductors is at once apparent.

All of the cable constructions disclosed present a comparatively smooth core adapted to receive the lead sheath or other cover, and because of the simplicity of the construction of the indicating conductors they may be readily and quickly secured to other cable sections when it is necessary to splice two cables. The cable as a whole is of simple design with a simple and effective indicating means associated therewith. This is evidenced by the fact that no special construction for the cable core is needed in order to secure the indicating conductors thereon, it being possible to employ the indicating conductors and the moisture absorbing insulation with any type of cable design.

From the foregoing description it will be appreciated that I have designed a novel cable and a method and means for detecting and locating faults therein. In addition to this a simple and effective indicating conductor is associated with the cable which may be employed to locate faults without the loss of the service of the cable itself. It will also be appreciated that the detection of moisture within the cable sheath occurs before the moisture seeps into the cable conductors and the fault may be remedied in any convenient manner without the possibility of impairing the cable for further use while testing it to locate the fault.

With these advantages, it will be apparent that I have designed a cable which is of a simple and compact design, and which at the same time is of relatively inexpensive construction.

I wish it to be understood that I do not confine myself to the precise details of construction herein set forth, for example, the indicator conductors have been specifically described as being meshed, but it is intended and contemplated as a part of this invention that intersticed, perforated or apertured conductors that will perform the generic function of having a greater resistance than the resistance of a solid conductor of the same dimensions and material may be used.

Although specific illustrative embodiments of the invention have been described in some detail, it is to be understood that changes, additions, substitutions and omissions may be made therein within the spirit of the invention as defined by the appended claims.

I claim:

1. An electric cable having a conductive core encased within a metallic sheath, a plurality of layers of moisture repellent insulation positioned around said core, a metallic mesh indicating conductor spirally wrapped around the outermost layer of moisture repellent insulation and moisture absorbent insulation wrapped over the indicating conductor, said indicating conductor adapted to be employed for detecting and locating faults in the electric cable.

2. An electric cable having a conductive core, a plurality of layers of moisture repellent insulation positioned around said core, a plurality of metallic ribbon indicating conductors of a mesh construction, said indicating conductors being spirally wrapped around the cable core so that they do not cross each other, moisture absorbent insulation wrapped over the indicating conductors, the whole construction being encased within a protective sheath, said indicating conductors adapted to be employed to detect and locate faults in the cable.

3. An electric cable comprising a conductor core, moisture repellent insulation surrounding the conductor core, an indicating conductor having interstices therein wrapped spirally around the moisture repellent insulation, moisture absorbent insulation wrapped over the indicating conductor, and a metallic sheath encasing the moisture absorbent insulation.

4. An electric cable including a conductor core, moisture repellent insulation surrounding the conductor core, an indicating conductor wrapped spirally around the moisture repellent insulation, said indicating conductor having a resistance greater than the resistance of a solid conductor of the same material and over-all dimensions, moisture absorbent insulation wrapped about the indicator conductor, and a protective sheath encasing the moisture absorbent insulation.

JOHN J. ALLES.